UNITED STATES PATENT OFFICE 2,362,022

PURIFICATION OF WATER

Hubert L. Olin, Iowa City, Iowa

No Drawing. Application October 9, 1941,
Serial No. 414,279

20 Claims. (Cl. 210—23)

This invention relates to the purification of water and particularly to the clarification of water. The prime object of clarification is to effect the maximal removal of turbidity producers with a minimum of objectionable side effects such, for example, as increasing the permanent hardness of the water.

The principal turbidity producer is silt, which consists of quartz and complex silicates dispersed, for the larger part, to colloidal dimensions. Silt particles carry negative electric charges, as do also water-borne microorganisms and minute forms of plant life. The term "negative dispersoids" will be used hereinafter to designate the aggregate of negatively charged particles that go to make up the turbidity producers in a water.

As a clarifying agent I use the hydrophilic, colloidal clay, sodium bentonite. The characteristics of this clay, which ground its unique effectiveness as a clarifier for water, require a rather full discussion. Throughout this application, unless the context indicates to the contrary, the use of the unqualified term "bentonite" is to be understood as meaning sodium bentonite.

The sodium bentonite, which I employ in the practice of the present invention, is the Wyoming or Black Hills type of swelling bentonite. This type of bentonite is composed almost entirely of particles of montmorillonite that expand or swell greatly when dispersed in water.

So far as bentonites, ball clays, kaolins and plastic fireclays contain substantial proportions of clay particles of dimensions below the upper limit for so-called "colloidal particles"—namely, 0.1 to 0.2 micron—all of such clays may be termed colloidal clays. If a sample of each type of clay be dispersed in water, a colloidal sol will be formed of that fraction of the sample which consists of colloidal particles. In only one case, however, namely, that of Wyoming or Black Hills type bentonite, are these colloidal particles typically hydrophilic in character. That is, each particle is hydrated or solvated, and made bulky and loose-textured by firmly bound water which penetrates between, and expands greatly, the lattice sheets making up each unit of a bentonite particle. The bound water also forms a thick sheath which encloses each unit. In this respect sodium bentonite occupies a solitary position as a member of a group of clays often referred to as colloidal clays; for all other members of this group represent types of clay that contain only a few particles which expand markedly, or that contain particles which swell little or not at all in the presence of water. All these other clays are hydrophobic colloids, and are incapable of use in the practice of the present invention.

The Wyoming or Black Hills type of swelling bentonite is designated as sodium bentonite because its content of sodium definitely exceeds its content of calcium. As the sodium content of a natural bentonite decreases, and the calcium content increases, the bentonite exhibits less and less capacity for swelling; until in calcium bentonite, in which there is an excess of calcium over sodium, there is exhibited little capacity for swelling or hydration upon dispersion in water. As a consequence, sodium bentonite exhibits base-exchange or zeolitic activity in that it is capable of exchanging its sodium for metallic elements of higher valency, for example, calcium and magnesium. By reason, however, of the relatively small doses of sodium bentonite used in the practice of the present invention, its zeolitic action is of no particular moment.

Sodium bentonite possesses the following characteristics which relate more specifically to the practice of the present invention: When suspended in water which contains unsubstantial quantities of electrolytes or ionizable substances, sodium bentonite swells to as much as thirty times its original volume to form a gelatinous paste which, upon further dilution with water—if needed—can be dispersed by stirring to form a colloidal sol. In this sol the disperse phase comprises negatively charged, highly hydrated bentonite particles of the type hereinabove described. In the absence of some suitable flocculating agent such a sol will show no separation of the disperse phase for an indefinite period of time due to the mutual repulsion of the outer, cationic portion of Helmholtz electrical double layers, the cations being carried by the "bound" water surrounding each bentonite particle. If, however, an electrolyte, or ionizable material capable of furnishing cations, be added in suitable proportion to such a bentonite sol, there ensues a sufficient neutralization of the anions in the Helmholtz double layers—the anions being carried by the bentonite particles themselves—and concomitant reduction in their mutual repulsion, so that groups of the particles coalesce to form aggregates of varying sizes. In the case of a majority of the bentonite particles this aggregation extends until there is a rapid formation of visible flocs. As will appear hereinafter, my discovery that particles making up a variable proportion of the disperse phase in a bentonite hydrosol exhibit, in varying degrees, a refractory behavior toward a given flocculating agent, constitutes the starting point for the development of the present invention.

It is of first importance to the successful use of bentonite flocs in water clarification that the formation of the flocs be brought about in a manner to prevent any substantial loss of the water of hydration bound by each particle prior to flocculation. The reason is that bentonite particles carrying electric charges of the same sign as the negative dispersoids which they are to eliminate from the water can effect clarification only by virtue of an occluding, engulfing, entraining or mopping-up action due to a combination of the net-like structure of each bentonite particle with the "bound" water of hydration which fills the interstices of the particle and forms a thick, adherent, fluid sheath around it. In order, therefore, to avoid the well-known dehydrating effects of electrolytes on hydrophilic or emulsion colloids in general, the quantity of ionizable material should be kept, as far as possible, to the minimum needed to secure adequate flocculation of the bentonite. By "adequate flocculation" I mean the substantially immediate aggregation—in response to a suitable dose of flocculating agent—of all but refractory or hyposensitive portion of the bentonite particles (or subflocs thereof) to form visible flocs which retain enough of their pre-flocculation water of hydration so that, throughout the successive processes involved in their formation, growth and sedimentation, they function, in effect, as virtually impermeable webs or nets, and so are able to occlude, engulf, entrain, entrap or mop up negative dispersoids in their paths. Ordinarily I shall use "entrain" or "entrainment" to cover or define the modus operandi of clarification by sodium bentonite, whatever may be the character thereof in a particular case.

Before the preferred practice of the present invention is described, there need to be explained the more important considerations out of which the present method has been evolved. Prefatory thereto, it may be pointed out that the said method embodies a two-stage flocculation of sodium bentonite after it has been dispersed in the water to be treated. At each stage of flocculation of the bentonite, I preferably make use of flocculating agents which are specially adapted for that particular stage. In so doing, I apply, respectively, two out of three aspects of colloidal behavior which have been embodied in a general principle by Burton and Bishop—Journal of Physical Chemistry, vol. 24, page 701, at page 712. The Burton-Bishop principle may be stated as follows: As the concentration of colloidal particles in a sol decreases, the concentration of ions necessary to produce flocculation thereof (a) increases very rapidly in the case of monovalent ions; (b) remains substantially constant for divalent ions, whereas (c) in the case of trivalent ions it decreases almost directly with the decrease in concentration of the colloidal particles. It is to be observed that, when maximum economy in the use of flocculating reagents is sought, divalent ions are most efficient at high concentrations of colloidal particles, whereas trivalent ions are most efficient at low concentrations of the same colloidal particles. My use of this difference in efficiency, as between divalent and trivalent ions, will be discussed later herein.

The present invention constitutes an improvement over the invention claimed in my copending application Serial No. 168,440, filed October 11, 1937, wherein I have disclosed a method of clarifying water. The method there claimed comprises the addition, to a water to be treated, of a hydrosol of sodium bentonite in quantity proportioned to the turbidity of the water. Ionizable substances present in the water—supplemented, if necessary, by added ionizable material sufficient to make up any lack thereof—cause aggregation of most of the bentonite particles to form visible, hydrous flocs. In the course of their formation, coalescence and sedimentation these flocs entrain negative dispersoids in the water and thereby effect its clarification.

I shall designate the method just summarized as the one-flock method of bentonite clarification to distinguish it from the method embodying my present invention, which I shall call a two-flock method. The term "flock," as used herein, designates a single, visible clump of solvated bentonite, the plural thereof being "flocs." The term "flock," however, is used herein as a collective noun to designate the entire crop of flocs formed at a defined stage in the clarification of a water.

The present invention is an outgrowth of my observation that, in highly turbid waters treated by the one-flock method, the resulting applied or residual turbidities often are not as low as the turbidities desired in the purification of the average water supply, namely, from 5 parts to 15 parts per million (p. p. m.) parts of water. Occasionally this residual turbidity even exceeds the usually considered permissible maximum of 20 p. p. m.

My study of these occasional, undesirably high applied turbidities in one-flock, bentonite-treated waters eventuated in my discovery that the residual suspended matter does not consist, in any substantial proportion, or unentrained negative dispersoids originally present in the water, but is comprised for the most part of extremely minute floccules of sodium bentonite, the aggregation of which has failed to reach the stage of visible floc formation. In explanation thereof, it is known that, when a colloidal sol is flocculated by an optimal dose of a suitable reagent, which itself is not colloidal, the dispersion medium that is separable from the flocculated material is not optically empty, but when viewed under an ultramicroscope shows the presence therein of a small residuum of the colloidal disperse phase comprised of particles in varying stages of incipient aggregation. Similarly, in every hydrosol of sodium bentonite it may be expected that a fraction of the disperse phase will consist of particles which, in the present of an optimal flocculating concentration of ionizable substances, will undergo varying degrees of aggregation short of the formation of actual flocs. This incipient aggregation I designate as subflocculation, and the invisible aggregates as subflocs. Although these bentonite subflocs seem to entrain their respective proportions of negative dispersoids, their settling rates are very low, and they behave, for practical purposes, like colloidal particles.

In the practice of my invention I have noted that the smaller the dose of a bentonite that I employ, the larger seems to be the proportion thereof which is refractory or hyposensitive toward divalent cations. My experience with these lower doses of bentonite, more particularly those below about 35 parts per million parts of water, indicates a deviation from conformity to subdivision (b) of the Burton-Bishop rule.

In order to effect a maximal reduction of the residual turbidity in a water that has been subjected to a one-flock bentonite clarification, I have found that it is necessary only to cause a coalescence of subflocs until visible flocs are formed. The latter then settle rapidly, and leave a clear, supernatant water. This coalescence of subflocs is the essential feature of the second stage of my present method.

In describing my one-flock method in my copending application Serial No. 168,440, I point out, in substance, that I may use mono-, di- or trivalent ionizable compounds as agents for flocculating the sodium bentonite. I may constitute my one-flock method as the first stage in the practice of my present two-flock method. As I have indicated above, however, the most efficient practice of the first stage calls for the use, as far as possible, of divalent ionizable compounds as flocculators of the sodium bentonite. It is true that a critical concentration of a divalent compound is necessary in order to flocculate sodium bentonite at all; but once this critical concentration is reached, or slightly exceeded, all but the refractory portion of the bentonite particles will be flocculated, whether the dose of bentonite be large or small. In this respect my practice constitutes an application of subdivision (b) of the Burton-Bishop principle in the form stated above.

The first flock, then, which is formed in the first stage of my present process, comprises ordinarily a major portion of the dose of bentonite. Its function is to effect a purge of negative dispersoids in the water being treated. The second flock, formed in the second stage of my process, represents a scavenging or cleanup of the residual, subflocculated bentonite, with its quota of negative dispersoids. For this cleanup I preferably use a relatively minute dose of a trivalent ionizable metallic compound, such as a salt of aluminum or iron. Ordinarily I employ alum. I may use, however, divalent ionizable substances for the cleanup of subflocculated bentonite.

I am familiar with the use of, alum—commonly along with varying proportions of lime—as a water-clarifying agent. Alum is an effective clarifier, but possesses the disadvantage of increasing the sulfate hardness of the water if used in the amounts necessary when it is the principal or sole clarifying agent. My use of alum in the practice of the present invention is for quite a different purpose, and I employ it in a dosage only a fraction of that which would be required for the clarification of the same water were the alum to be used as the effective clarifying agent. In other words, the dose of alum which I employ is only that which is sufficient to complete the flocculation of subflocculated bentonite, and thereby to produce the second flock that I have defined above. My choice of alum, or of other trivalent ionizable compounds, for the second-stage flocculation is based upon the fact that the subflocculated bentonite is present in low concentration, and so its flocculation calls for application of subdivision (c) of the Burton-Bishop principle set forth above.

Although, for the reason just given, a trivalent ionizable compound is the reagent of choice for the second-stage flocculation of the bentonite, lime or other suitable divalent ionizable compounds may be used to flocculate bentonite subflocs, more particularly when addition of ionizable material is not required in order to effect adequate first-stage flocculation of the bentonite. When lime is substituted for alum as a second-stage flocculating agent, it may be used in a dose up to about 50 parts per million parts of water proportioned to the quantity of bentonite subflocs in the water separated from the first flock.

That alum is much less adapted to first-stage than to second-stage flocculation of bentonite is indicated by the following results obtained in tests of a raw river water. Each of the mean values is based upon 7 tests.

A water of mean turbidity of 140 p. p. m., subjected to one-flock clarification with 68 p. p. m. of bentonite and 17 p. p. m. of alum, showed a mean residual turbidity of 15.6 p. p. m.

A water of mean turbidity of 150 p. p. m. subjected to one-flock clarification with 34 p. p. m. of bentonite and 17 p. p. m. of alum, showed a mean residual turbidity of 17.4 p. p. m.

In the second set of tests the ratio of the alum to the bentonite was twice that which obtained in the first set of tests; yet the mean residual turbidity was not substantially different from that of the first set of tests.

When these results are compared with those set out in Examples 3 and 4 below, the inference is clear that alum is peculiarly adapted for second-stage flocculation.

My present method of two-stage flocculation of sodium bentonite, preferably in conjunction with the selective application of the Burton-Bishop principle, achieves a maximum of clarification from the dosage of sodium bentonite that I employ, at a cost for materials that is less than the cost of materials used in the practice of any method of the prior art which is capable of producing a like degree of clarification.

The preferred practice of the present invention comprises the following steps:

1. A slurry of sodium bentonite is prepared by mixing the clay in a minor body of water which contains unsubstantial quantities of ionizable substances. A previously treated water is suitable therefor. The proportion of bentonite in the slurry preferably may be around 5 per cent; but this concentration may be varied through a wide range, depending largely upon the turbidity of the water to be treated. That is, a water of high turbidity, other things equal, will call for a relatively high dose of bentonite which preferably is supplied by a slurry of sufficient concentration so as to obviate the need for inconveniently large volumes of the slurry.

The bentonite preferably is permitted to swell to a maximal degree in the minor body of water and then, by suitable stirring or mixing means, is dispersed to form a sol.

2. The bentonite sol is incorporated into a major body of the water to be clarified in a quantity sufficient to provide ordinarily between about 15 parts and about 125 parts of sodium bentonite per million parts of water. I have found that suitable doses of bentonite within this range ordinarily produce a satisfactory first-flock purge of negative dispersoids in waters of turbidities ranging from about 20 parts to about 2,500 p. p. m. In an unusual case of a water of very high turbidity, or of one in which there is an exceptionally high degree of dispersity of the turbidity producers therein, it may be necessary to employ the sodium bentonite in a dose exceeding 125 parts per million parts of water. The suitable dosage of bentonite, though roughly proportional to the turbidity of the water being treated, does not bear necessarily a linear relation thereto. I have found, for instance, that a raw water of turbidity scarcely greater than 20 p. p. m. requires ordinarily a dose of bentonite sufficient to provide about 15 parts per million parts of water. Yet this same dose may be adequate for the first-stage clarification of a water having a turbidity in the neighborhood of 150 p. p. m. Again, it may be necessary to dose a water of about 600 p. p. m. turbidity with about 75 parts of sodium bentonite per million parts of water; and yet less than twice that dose of the bentonite may be entirely adequate for a purge of a water of turbidity more than four times as great. It may be left to the experienced waterworks engineer or chemist to determine, by known methods, the optimum dose of sodium bentonite necessary for the first-stage clarification of a particular water in accordance with the present process. In general, it may be stated that sodium bentonite, when added in a dose of about 30 parts to 40 parts per million parts of a water of turbidity about 300 p. p. m. should yield a first-stage residual turbidity in the neighborhood of 20 p. p. m.; while a dose of about 125 parts per million parts of a water of turbidity about 2,500 p. p. m. should yield a first-stage residual turbidity below 40 p. p. m.

Under ordinary conditions a water, which is to be clarified, contains divalent cations, particularly calcium and magnesium ions, in amounts sufficient to effect adequate flocculation of the bentonite. In the case of a highly turbid water, however, particularly one coming from a storm run-off flow, the quantity of ionizable substances present therein may not be sufficient to effect adequate flocculation of the bentonite that is required for clarification. A deficit of ionizable substances in the water to be clarified ordinarily may be detected by an appreciable delay in the formation of flocs of desirable size after the calculated dose of bentonite has been added to the water. Where such a deficit exists, I add to the water ionizable material in the form of some practically suitable acid, salt or alkali. As I have pointed out already, ionizable material that will yield divalent cations is best adapted for first-stage bentonite flocculation. Consequently I prefer to use the cheap and readily available lime—in the form of the oxide or hydroxide—in quantity only enough to make up any deficit of ionizable substances. It is very seldom necessary to add lime in a quantity to provide more than 50 parts of CaO per million parts of water. Where additional ionizable material is required, it may be added to the water to be clarified either before or after the incorporation therewith of the bentonite slurry. Ionizable material, however, should not be added to the slurry.

After the calculated dose of sodium bentonite has been added to the water to be clarified—either prior to or subsequent to the addition of ionizable material, sufficient for adequate flocculation of the bentonite, if found necessary—the water is stirred by suitable means to facilitate formation of the first flock and entrainment of negative dispersoids thereby. The water then is permitted to settle, preferably after having been run into a separate settling basin. The periods allowed for mixing and for settling need not be longer than would be necessary if the same water were to be subjected to a standard treatment with alum and lime. Often, in fact, the settling rate after a bentonite purge is strikingly rapid. After suitable settling of the first floc and entrained dispersoids the supernatant water is separated therefrom, ordinarily by being passed into a second mixer. This separation of the supernatant water following the first flock bentonite urge represents the end of the first stage of the present process.

3. To this separated water there now is added a small dose of a trivalent, ionizable metallic compound such as a soluble salt of aluminum or of (ferric) iron. For this second-stage cleanup or scavenging of the residual turbidity I prefer to use alum in a dose ranging from about 5 parts to about 35 parts per million parts of water. After a suitable period of mixing the water is passed to a filter or to a second settling basin. The water ultimately separated by filtration or settling may be expected to have a final turbidity below 20 p. p. m. In many waters, however, the final turbidity will be found to have been reduced below 10 p. p. m.

The following examples of results that I have obtained in the practice of the present method with raw river waters indicate not only its efficiency but also its economy in the use of materials in comparison with a typical method of the prior art as well as with the one-flock method of my copending application Serial No. 168,440.

*Example 1.*—(The mean values given in this example are based upon 13 tests). A one-flock clarification of a water of mean initial turbidity of 77.5 p. p. m., treated with 50 parts of sodium bentonite per million parts of water, yielded a water having a mean subfloc turbidity of 18 p. p. m. The same raw water, when treated with 65 p. p. m. of alum and 9 p. p. m. of lime, gave an applied turbidity of 12 p. p. m.

*Example 2.*—(The mean values given in this example are based upon 9 tests). A two-flock clarification of a water of mean initial turbidity of 82 p. p. m., treated with 17 p. p. m. of sodium bentonite, and the separated water dosed, three hours later, with 17 p. p. m. of alum, yielded a water of mean final turbidity 7.7 p. p. m. The same raw water, after treatment with 58 p. p. m. of alum and 14 p. p. m. of lime, had an applied turbidity of 9 p. p. m.

*Example 3.* A water of initial turbidity of 300 p. p. m. was subjected to two-flock clarification with 30 p. p. m. of bentonite. One hour later the water separated from the first flock was treated with 10 p. p. m. of alum. The final turbidity of the water was 14 p. p. m. When a quantity of the same raw water was treated with 70 p. p. m. of alum, the applied turbidity was 19 p. p. m.

*Example 4.* A water of initial turbidity of 630 p. p. m. was subjected to two-flock clarification with 75 p. p. m. of bentonite. Two hours later the water separated from the first flock was treated with 10 p. p. m. of alum. The final turbidity of the water was 9 p. p. m. When a quantity of the same raw water was treated with 85 p. p. m. of alum, the applied turbidity was 25 p. p. m. When the latter test was repeated, but with 105 parts of alum, the applied turbidity was 13 p. p. m.

I claim:

1. The process of clarifying water which comprises, preparing a sol of sodium bentonite in a minor body of water containing unsubstantial amounts of ionizable substances, incorporating said sol in a major body of water to be clarified, permitting the sodium bentonite to form a first flock and to entrain negative dispersoids in said water, separating the water from said first flock and entrained material, adding to said separated water polyvalent, ionizable material in quantity sufficient to effect flocculation of bentonite subflocs, and separating a purified water from the second flock.

2. The process of clarifying a water, in which the content of ionizable substances is insufficient to effect adequate first flocculation of sodium bentonite to be added to said water, which comprises preparing a sol of sodium bentonite in a minor body of water containing unsubstantial amounts of ionizable substances, mixing with a major body of water to be clarified ionizable material adapted to yield cations of the class consisting of monovalent cations and divalent cations, in amount sufficient to make up the lack of ionizable substances, incorporating the bentonite sol with the major body of water, permitting the formation of a first flock and the entrainment of negative dispersoids thereby, separating the water from the first flock and entrained dispersoids, adding to said separated water a trivalent, ionizable metallic compound in quantity sufficient to effect flocculation of bentonite subflocs, and separating a purified water from the second flock.

3. In the process of clarifying water by a two-stage flocculation of sodium bentonite incorporated therewith, wherein the first stage comprises dispersing in the water unflocculated sodium bentonite, thereby causing the bentonite to form a settleable first flock and non-settleable subflocks and to entrain negative dispersoids, and separating the water from the first flock, the second-stage steps comprising adding to the water, separated from the first flock, polyvalent ionizable material in quantity sufficient to effect flocculation of bentonite subflocs, and separating a purified water from the second flock.

4. In the process of clarifying water by a two-stage flocculation of sodium bentonite incorporated therewith, wherein the first stage comprises dispersing in the water unflocculated sodium bentonite, thereby causing the bentonite to form a settleable first flock and non-settleable subflocs and to entrain negative dispersoids, and separating the water from the first flock, the second stage steps comprising dosing the water, separated from the first flock, with alum in amount to provide between about 5 parts and about 35 parts per million parts of water, proportioned to the quantity of bentonite subflocs in said separated water, and separating a purified water from a second flock.

5. In the process of clarifying water by a two-stage flocculation of sodium bentonite incorporated therewith, wherein the first stage comprises dispersing in the water unflocculated sodium bentonite, thereby causing the bentonite to form a settleable first flock and non-settleable subflocs and to entrain negative dispersoids, and separating the water from the first flock, the second stage steps comprising dosing the water, separated from the first flock, with lime in amount to provide up to about 50 parts per million parts of water, proportioned to the quantity of bentonite subflocs in said separated water, and separating a purified water from a second flock.

6. In the process defined in claim 1, incorporating the bentonite sol with the major body of water in amount to provide between about 15 parts and about 125 parts per million parts of water, suitably proportioned to the initial turbidity thereof, and adding to the water, separated from the first flock, alum in amount to provide between about 5 parts and about 35 parts per million parts of water, proportioned to the quantity of bentonite subflocs in said separated water.

7. In the process defined in claim 1, incorporating the bentonite sol with the major body of water in amount to provide between about 15 parts and about 125 parts per million parts of water, suitably proportioned to the initial turbidity thereof, and adding to the water, separated from the first flock, lime in amount to provide up to about 50 parts per million parts of water, proportioned to the quantity of bentonite subflocs in said separated water.

8. The process of clarifying water which comprises, dispersing therein unflocculated sodium bentonite, thereby causing the bentonite to form a settleable first flock and non-settleable subflocs and to entrain negative dispersoids, separating the water from the first flock, adding to the separated water polyvalent ionizable material to effect flocculation of the bentonite subflocs, and separating a purified water from the second flock.

9. The process of clarifying water which comprises, separately dispersing therein unflocculated sodium bentonite and ionizable material adapted to yield cations of the class consisting of monovalent cations and divalent cations, thereby causing the bentonite to react with ionizable substances present in the water and with the the added ionizable material to form a settleable first flock and non-settleable subflocs and to entrain negative dispersoids, separating the water from the first flock, adding to the separated water ionizable material adapted to yield trivalent cations to effect flocculation of the bentonite subflocs, and separating a purified water from the second flock.

10. In the process of clarifying water by a two-stage flocculation of sodium bentonite incorporated therewith wherein the first stage comprises separately dispersing in the water unflocculated sodium bentonite and ionizable material adapted to yield cations of the class consisting of monovalent cations and divalent cations, thereby causing the bentonite to react with ionizable substances present in the water and with the added ionizable material to form a settleable first flock and non-settleable subflocks and to entrain negative dispersoids, and separating the water from said first flock, the second-stage steps comprising adding to the water, separated from the first flock, trivalent ionizable material in quantity sufficient to effect flocculation of bentonite subflocs, and separating a purified water from the second flock.

11. The process defined in claim 2 wherein (a) the bentonite sol is added to the water to be clarified in an amount to provide between about 15 parts and about 125 parts of sodium bentonite per million parts of water, suitably proportioned to the initial turbidity thereof, (b) the ionizable material adapted to yield divalent cations comprises lime in amount to provide up to about 50 parts per million parts of water, proportioned to make up the lack of ionizable substances in said water, and (c) the trivalent, ionizable metallic compound comprises alum in amount to provide between about 5 parts and about 35 parts per million parts of water, suitably proportioned to the quantity of bentonite subflocs in the water separated from the first flock.

12. The process of clarifying water which comprises, incorporating therewith unflocculated sodium bentonite, permitting the bentonite to react with cations present in said water to form a settleable first flock and non-settleable subflocs, and to entrain negative dispersoids, thereafter adding to said water polyvalent ionizable material in amount sufficient to flocculate the bentonite subflocs to form a second flock, and separating a purified water from the flocculated bentonite.

13. The process defined in claim 12 wherein (a) the sodium bentonite is provided in amount between about 15 parts and about 125 parts per million parts of water, suitably proportioned to the initial turbidity thereof, and (b) the polyvalent ionizable material comprises lime in amount to provide up to about 50 parts per million parts of water, suitably proportioned to the quantity of bentonite subflocs.

14. The process defined in claim 12 wherein (a) the sodium bentonite is provided in amount between about 15 parts and about 125 parts per million parts of water, suitably proportioned to the initial turbidity thereof, and (b) the polyvalent ionizable material comprises alum in amount to provide between about 5 parts and about 35 parts per million parts of water, suitably proportioned to the quantity of bentonite subflocs.

15. The process of clarifying water, whereof the content of ionizable substances is insufficient to effect adequate first flocculation of sodium bentonite to be added to said water, which comprises, separately dispersing therein unflocculated sodium bentonite and ionizable material adapted to yield cations of the class consisting of monovalent cations and divalent cations, permitting the bentonite to react with cations naturally present in said water, and with the ionizable material added thereto, to form a settleable first flock and non-settleable subflocs and to entrain negative dispersoids, thereafter adding to said water trivalent ionizable material in amount sufficient to flocculate the bentonite subflocs to form a second flock, and separating a purified water from the flocculated bentonite.

16. The process defined in claim 15, wherein (a) the sodium bentonite is provided in amount between about 15 parts and about 125 parts per million parts of water, suitably proportioned to the initial turbidity thereof, (b), the ionizable material adapted to yield divalent cations comprises lime in amount to provide up to about 50 parts per million parts of water, proportioned to make up the lack of ionizable substances needed for first flocculation, and (c) the trivalent ionizable material comprises alum in amount to provide between about 5 parts and about 35 parts per million parts of water, suitably proportioned to the quantity of bentonite subflocs.

17. In the process defined in claim 12, the steps of adding to the water polyvalent ionizable material in amount sufficient to flocculate the bentonite subflocs, and separating a purified water from the flocculated bentonite.

18. In the process defined in claim 15, the steps of adding to the water trivalent ionizable material in amount sufficient to flocculate the bentonite subflocs, and separating a purified water from the flocculated bentonite.

19. In the process defined in claim 2, the steps of adding to water, separated from a first flock, a trivalent, ionizable metallic compound in quantity sufficient to effect flocculation of bentonite subflocs, and separating a purified water from the second flock.

20. In the process defined in claim 1, the steps of adding to water, separated from a first flock, polyvalent ionizable material in quantity to effect flocculation of bentonite subflocs, and separating a purified water from the second flock.

HUBERT L. OLIN.